L. L. TAYLOR.
HUMIDIFIER.
APPLICATION FILED JUNE 28, 1919.
1,362,649.
Patented Dec. 21, 1920.
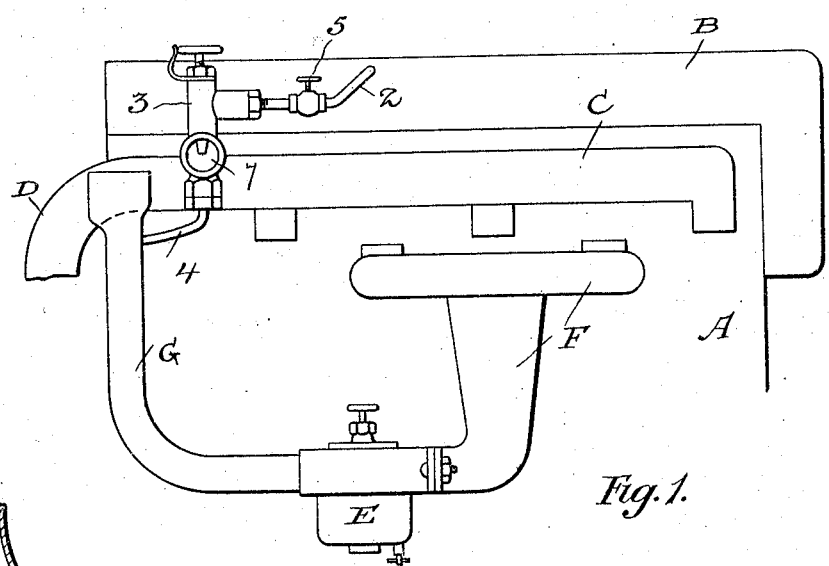
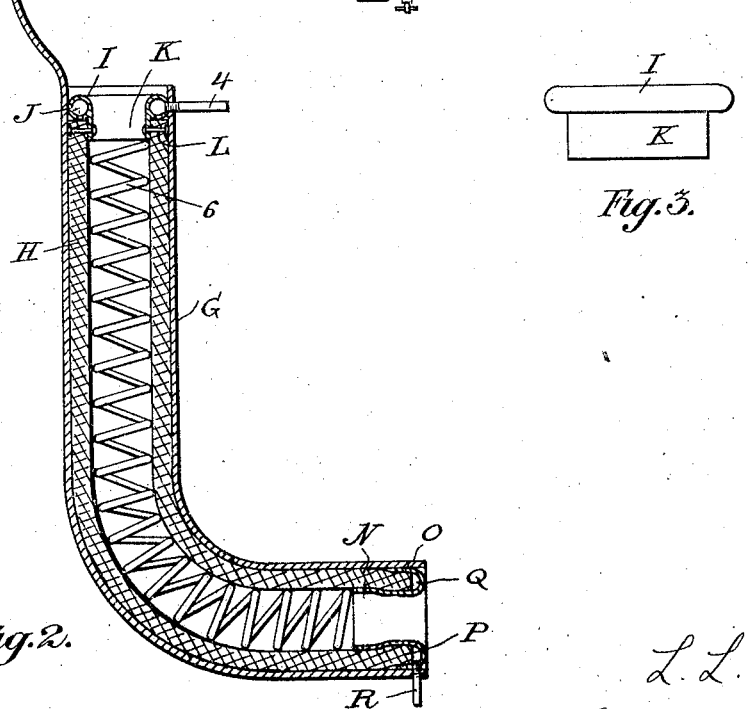

UNITED STATES PATENT OFFICE.

LAURENCE LELAND TAYLOR, OF TORONTO, ONTARIO, CANADA.

HUMIDIFIER.

1,362,649.  Specification of Letters Patent.  Patented Dec. 21, 1920.

Application filed June 28, 1919. Serial No. 307,360.

*To all whom it may concern:*

Be it known that I, LAURENCE LELAND TAYLOR, of the city of Toronto, county of York, Province of Ontario, Canada, a subject of the King of Great Britain, have invented certain new and useful Improvements in Humidifiers, of which the following is a specification.

My invention relates to improvements in humidifiers, and one object of my invention is to humidify the air before it passes into the carbureter. Another object of my invention is to utilize the ordinary air intake pipe in putting my invention into practice and so reduce to a minimum the cost of installation of the device, and eliminate unnecessary additional weight.

In the following specification, I shall describe one embodiment of my invention, and what I claim as new will be pointed out in the claims forming part of this specification.

Figure 1 is a side elevation of portion of an internal combustion engine showing in side elevation my device coupled up to the carbureter. Fig. 2 is a vertical central longitudinal section through the ordinary air intake pipe showing the same adapted to put my invention into effect, and Fig. 3 is a side elevation of a suitable means whereby water is introduced into the air intake pipe.

In the drawings, like characters of reference refer to the same parts.

It is well known that the introduction of a certain percentage of moisture into the cylinder of an internal combustion engine will practically eliminate all carbon deposit, and the presence of said moisture will quite sensibly increase the power obtained from the fuel. But I have found that greater efficiency is secured from a given quantity of fuel if the explosive moisture within the carbureter be charged with the necessary humidity or moisture before the same is drawn into the cylinder, and that the formation of carbon within the cylinder is substantially eliminated.

In putting my invention into practice, broadly considered, I provide a passage or conduit, the walls of which are more or less saturated with water so that the current of air passing therethrough will become humidified prior to its entry into the carbureter. Means is provided whereby the water supply is controlled at will; and although the water will preferably be taken from the water jacket of the engine, it will be understood that any suitable source of supply for the water may be provided.

Since in many makes of cars the ordinary air intake pipe is positioned with its intake end adjacent the exhaust pipe, the air entering into said intake pipe is heated to an appreciable extent, and, therefore, on its entry through said intake pipe or conduit what moisture may have been evaporated therefrom by reason of its contact with the hot exhaust pipe, will be restored as it passes through said intake pipe or conduit, and an increase in moisture content above that of the outside air will be provided prior to the entry of air into the carbureter. The removal of humidity or moisture from the air by reason of its contact with the exhaust pipe will render the condition of the air ideal for the absorption of moisture as it passes through the conduit into the carbureter.

A is any suitable type of internal combustion engine, and for illustrative purposes only, the same is shown provided with a water jacket B. C is the exhaust manifold, and D the exhaust pipe opening therefrom. E is any suitable carbureter, and the same is coupled after any suitable manner to the intake manifold F. G is an ordinary air intake pipe, and the upper end thereof is positioned adjacent the exhaust pipe D in a well-known manner so that current of air entering into said pipe or conduit will become more or less heated to a higher temperature than that of the outside air. The said pipe or conduit G of course is coupled in any well-known manner to the carbureter E.

According to the embodiment disclosed of my invention, I line the pipe or conduit G with a tubular member H made of suitable material that will readily absorb water, such as a wick made of asbestos or cotton, and this tubular member is suitably maintained within said pipe or conduit. A suitable means for this purpose and which at the same time provides convenient means for introducing the water to said tubular member comprises an annular tube I which is substantially of the same diameter as the internal diameter of the pipe or conduit G so as to have snug fit therewith. This annular tube is provided with holes or apertures J, and since this tube rests in contact with the tubular member H, water passing from the tube through said apertures or holes J will pass into said tubular member H. The annular tube I is suitably coupled to the tubular member H by any suitable means. A convenient means for this purpose may comprise a flange K forming part of said annular tube, and this flange extends into the bore of said tubular member H. Rivets L or equivalent means are used to couple said flange K and member H together.

A convenient means for maintaining the lower end of the tubular member H in position comprises a tubular bushing N, portion of which extends into the bore of said member H. Said bushing is provided with an annular flange O, and between this flange and the body of the bushing is positioned the lower end P of the member H. This lower end does not extend down into the bottom of the annular groove which said annular flange forms, and since the said lower end P is not pinched, any surplus water may accumulate in said annular groove and drain thereout of through the pipe R.

The water may be passed into the pipe or conduit G from any suitable source. For convenience of illustration, I have shown a pipe or tube 2 as conveying water from the water jacket B to the sight-feed angle valve 3, whence the water passes through the pipe or tube 4 into the annular tube I, as shown clearly in Fig. 2. Mounted in the pipe or tube 2 is a valve 5 whereby the supply of water may be cut off when the engine is not in operation.

If desired, I may mount within the tubular member or lining H, a helical member 6 which will positively maintain the said tubular member or lining in contact with the inner walls of the pipe or conduit G. When this tubular member or lining H is made with thick walls, I have not found it necessary to use the helical member 6, and, therefore, this may be omitted if desired.

The use of the valve 3 is not absolutely essential, but since it is provided with a sight feed 7, whether water is passing into the pipe or conduit G can be readily seen.

By one skilled in this art, it will be understood that my invention can be applied to any existing make of air intake pipe, and, therefore, the cost of installation is quite small.

The replacement of the lining H can be readily made, and without skilled help.

Since coils of the helical member 6 will project into the bore of the tubular member H, it is conceivable that the current of air passing through said air conduit will be given a rotary movement and so be agitated sufficiently to insure all particles of air being brought into contact with the liquid-charged walls of the pipe or conduit G.

While I have described what I consider to be the best embodiment of my invention, it must be understood that the principle may be embodied in different forms, and I desire not to be limited beyond the requirements of the prior art and the terms of my claims.

What I claim is,

1. A humidifier comprising an air-conduit having an inlet and an outlet, and adapted at its outlet end for connection with a carbureter; a tubular wick lining said air-conduit, and an annular tube located within the intake end of said air conduit, and provided with an inlet leading from a suitable source of water supply, and further provided with apertures in its under side conveying water uniformly into one end of said tubular wick against which said annular tube rests, which tube is adapted to be coupled to said wick.

2. A humidifier comprising an air-conduit having an inlet and an outlet, and adapted at its outlet end for connection with a carbureter; a tubular wick lining said air-conduit; an annular tube located within the intake end of said air conduit, and provided with an inlet leading from a suitable source of water supply, and further provided with apertures in its under side conveying water uniformly into one end of said tubular wick against which said annular tube rests, which tube is adapted to be coupled to said wick, and an annular bushing mounted within the lower end of said tubular wick and sufficiently spaced beyond the extreme end thereof to form an apertured annular groove to receive any excess of water and to carry same away.

3. A humidifier comprising an air-conduit having an inlet and an outlet, and adapted at its outlet end for connection with a carbureter; a tubular wick lining said air-conduit; an annular tube located within the intake end of said air conduit, and provided with an inlet leading from a suitable source of water supply, and further provided with apertures in its under side conveying water uniformly into one end of said tubular wick against which said annular tube rests, which tube is adapted to be coupled to said wick, and a spiral member positioned within said tubular wick and extending from near the intake of said conduit to substantially the outlet therefor.

LAURENCE LELAND TAYLOR.